Patented Sept. 13, 1932

1,877,748

UNITED STATES PATENT OFFICE

LEONARD P. DOVE, OF MINOT, NORTH DAKOTA, ASSIGNOR, BY MESNE ASSIGNMENTS, TO R. M. STEE, TRUSTEE, OF MINOT, NORTH DAKOTA

DYE AND PROCESS OF MAKING SAME

No Drawing. Application filed February 11, 1929. Serial No. 339,280.

This invention relates to the preparation of dye solutions from dyes, (aniline, vegetable, mineral) heretofore generally regarded as soluble or dispersable in water only, without the aid of water.

Many dyes, generally classed as water soluble have desirable properties such as being unusually fast to light or washing, the usefulness of which dyes has been limited due to the presence of water used to dissolve them. It has been long recognized that some method to render these dyes soluble in other media than water would greatly extend their use and in many cases save considerable expense in coloring a number of materials.

As one illustration of the many useful applications of this invention is the preparation of non-aqueous wood stains or dye solutions for coloring wood. Heretofore water dye solutions for stains have been prepared in water solutions and when applied to the wood the water present loosens the fibers of the wood resulting in grain raising or fuzzing or roughening of the wood. To overcome this a wood finisher is put to considerable expense to make the wood smooth again in preparation for the finish of oil, shellac, varnish, lacquer or enamel. In spite of this trouble and expense many wood finishers have still adhered to the use of these water dyes in water solution because of their fastness to light and other desirable properties.

Having mentioned but one of many advantages that will result from the application of my invention I will now disclose the method of preparing dye solutions from water dyes without the necessary aid of water for dissolving.

For my dye solutions any one of a large number of glycol ethers may be employed and the following, although appearing in the order of preference, are listed merely as illustrative:

1. Ethylene glycol mono ethyl ether
2. Ethylene gylcol mono methyl ether
3. Ethylene glycol mono iso propyl ether
4. Ethylene glycol mono n-propyl ether
5. Ethylene glycol mono iso butyl ether
6. Ethylene glycol mono n-butyl ether
7. Propylene glycol mono ethyl ether
8. Propylene glycol mono methyl ether
9. Propylene glycol iso propyl ether
10. Propylene glycol n-propyl ether As a typical example of the application of my invention the following will illustrate the general principle of the operations without limiting this invention to the specific materials or quantities used.

Example 1

Ten parts by weight of orange Y (a common commercial acid dye) Schultz No. 145, Color Index 151 are dissolved or pasted with from 10 to 100 parts by weight of ethylene glycol resulting in more or less complete solution. To this mixture are added from 50 to 500 parts by weight of ethylene glycol mono ethyl ether whereupon the dye solution is further diluted or dispersed resulting in a stable solution or dispersion of the dye. This dye solution may be further diluted or thinned with ethyl alcohol, methyl alcohol or benzol or a mixture of these solvents without precipitation of the dye.

Example 2

Ten parts by weight of croceine scarlet MOO (a common commercial water dye) Schultz No. 227, Color Index 252 are added to 50–100 parts by weight of ethylene-glycol-mono-butyl-ether and stirred or agitated until the solution is more or less complete. The clear solution of the dye may be decanted or removed by other well known means from any insoluble matter. If desired this dye solution may be further diluted or thinned with methyl alcohol, ethyl alcohol or other suitable organic solvent more or less free from water, without appreciable separation of the dye from solution.

It is not definitely known why the derivatives of the ethylene series of hydrocarbons render dyes, otherwise soluble in water, soluble in media virtually without water.

In certain cases these dyes belong to the so called "acid dyes" having a more or less labile hydrogen atom or ion. It is possible that this atom or ion combines loosely with the carbon in the ethylene compound or with one of the groups or atoms attached to the carbon atoms and thus changes the dye to one stable in non-aqueous solvents.

Another possibility is that the dye becomes colloidal through gaining an electric charge on the colloidal particle, this charge in turn being sufficient to keep the particles from agglomerating and results in a dispersoid or colloidal solution stable to thinners or media not otherwise a solvent. The ethers of ethylene glycol are specially effective in keeping the dye stable in the absence of water.

These explanations are given as suggestions only and are not essential to the practice of rendering dyes soluble in mono-aqueous solvents.

It is further not critical to this invention that water be absent in the preparation of these dye solutions since measurable percentages of water may be present accidentally or be added without interference except as the water may be undesirable as a constituent of the mixture. The absence or presence of water is not the essence of this invention since it may be omitted or absent at the option of the user except as it may be introduced through the use of not strictly anhydrous solvents.

Having thus described my invention, what I claim as new and desire to secure by Letters Patent is:

1. A dye in organic dispersion comprising (1) a dye material normally insoluble in the common organic solvents, (2) a member of a group consisting of ethylene glycols and alkyl ethers of the ethylene glycols and (3) a common organic solvent as a dispersion medium.

2. A process of preparing a dye in organic dispersion which comprises mixing (1) a dye material normally insoluble in the common organic solvents with (2) a member of a group consisting of the ethylene glycols and alkyl ethers of the ethylene glycols and diluting with (3) a common organic solvent as a dispersion medium.

3. A dye in organic dispersion as defined in claim 1, in which the dispersion medium is selected from a group consisting of alcohols and members of the benzene series of hydrocarbons.

4. A process of producing a dye in organic dispersion as defined in claim 2, in which the dispersion medium is selected from a group consisting of alcohols and members of the benzene series of hydrocarbons.

5. A dye in organic dispersion as defined in claim 1, in which the dispersion medium is an alcohol.

6. A process of producing dyes in organic dispersion as defined in claim 2, in which the dispersion medium is an alcohol.

7. A dye in organic dispersion as defined in claim 1, in which the dispersion medium is benzene.

8. A process of producing dyes in organic dispersion as defined in claim 2, in which the dispersion is benzene.

9. A dye in organic dispersion as defined in claim 1, in which the dispersion medium is a lower alcohol.

10. A process of producing dyes in organic dispersion as defined in claim 2, in which the dispersion medium is a lower alcohol.

11. A dye in organic dispersion as defined in claim 1, in which the dispersion medium is a member of the benzene series of hydrocarbons.

12. A process of producing dyes in organic dispersion as defined in claim 2, in which the dispersion medium is a member of the benzene series of hydrocarbons.

LEONARD P. DOVE.